(No Model.)
M. MATTHEWS.
LAMP.
No. 317,160.  Patented May 5, 1885.
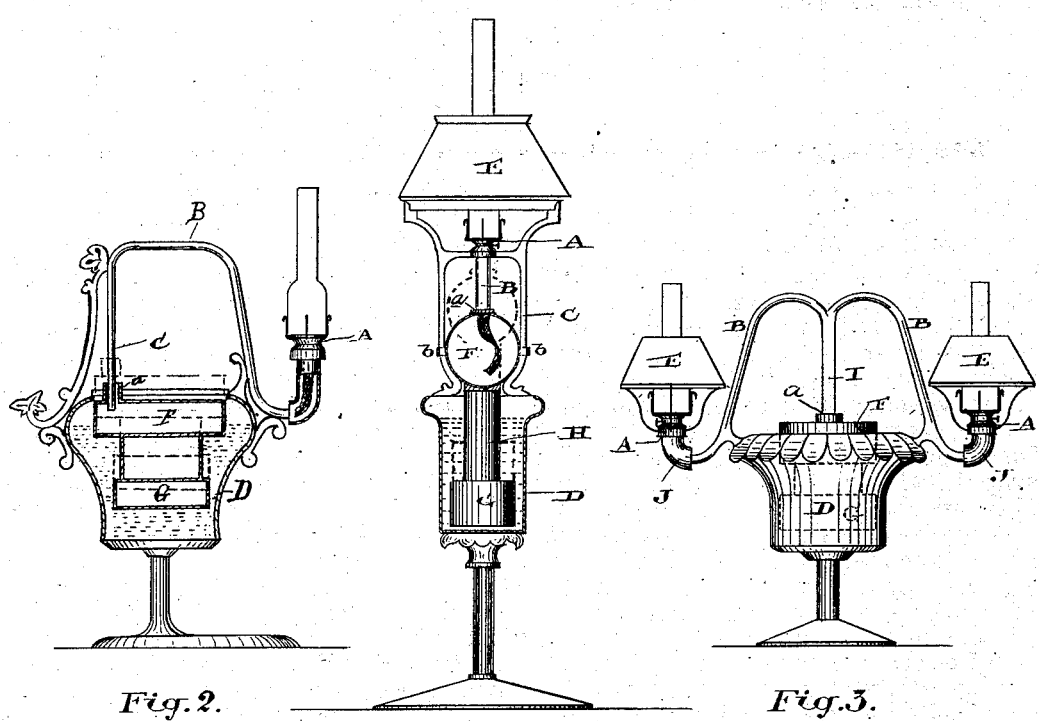
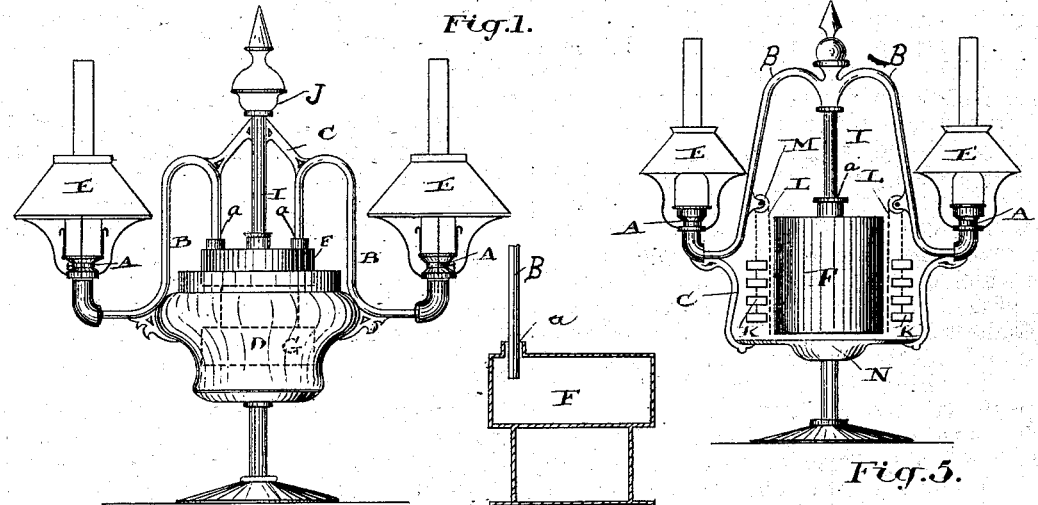
Witnesses.
J. B Fetherstonhaugh
C. C. Baldwin
Inventor:
Marmaduke Matthews
by Donald C. Ridout & Co
Attys

UNITED STATES PATENT OFFICE.

MARMADUKE MATTHEWS, OF TORONTO, ONTARIO, CANADA.

LAMP.

SPECIFICATION forming part of Letters Patent No. 317,160, dated May 5, 1885.

Application filed May 23, 1884. (No model.) Patented in Canada June 9, 1884, No. 19,530.

*To all whom it may concern:*

Be it known that I, MARMADUKE MATTHEWS, of the city of Toronto, in the county of York, in the Province of Ontario, Canada, artist, have invented certain new and useful Improvements in Fluid-Burning Lamps; and I do hereby declare that the following is a full, clear, and exact description of the same.

The object of the invention is to so construct a lamp that the top-level of the oil or fluid shall always remain at the same relative distance from the burner; and it consists, essentially, in so connecting the oil or fluid reservoir to the tube leading from the burner that it will move freely up on the said tube as the oil is consumed, the said reservoir being so balanced either by flotation or weights that it will move upwardly only in proportion to the consumption of the oil or fluid within it, substantially as hereinafter explained.

Figure 1 represents an ordinary table-lamp in which the burner is located immediately over the oil-reservoir and the tube connecting the burner to the oil-reservoir is straight when centrally located within the lamp. Fig. 2 represents a lamp in which the tube connecting the burner to the oil-reservoir is arranged to act as a siphon. Fig. 3 represents a lamp with two burners supplied by a double siphon-tube which connects the burners to the reservoir. Fig. 4 represents a lamp with two burners connected to the oil-reservoir by two separate siphon-tubes, a central tube being provided for filling the oil-reservoir. All the lamps shown in these figures are constructed on the same principle, the reservoir in each being adjustably fitted onto the tubes, and each reservoir is balanced by flotation. Fig. 5 represents a lamp made in accordance with the invention, but having its reservoir balanced by weights. Fig. 6 is an enlarged detail showing the form of joint between the tube and oil-reservoir.

In the drawings like letters of reference indicate corresponding parts in each figure; but for the purpose of description I will refer to each figure separately in the specification.

In Fig. 1, A represents the burner provided with a wick-tube, B, held in position by the frame C, which is connected and separated by the main or outer body, D, of the lamp. This frame C is designed, as shown, to support the lamp-shade E.

F is the oil-reservoir, having a central hole, *a*, through which the wick-tube B passes, the said wick-tube being an easy fit, so that the reservoir F may be moved freely up and down upon the tube.

*b* are lugs formed on the reservoir F and arranged to fit onto the standards of the frame C, so that in moving up and down the reservoir is prevented moving laterally.

G is a light float connected by the rod or tube H to the oil-reservoir. This float G is contained within the outer body, D, of the lamp which is filled with water or other fluid. The size of the float G is calculated so that its displacement shall represent a little less than its own weight and that of the reservoir F when filled with oil, consequently when the reservoir F is filled with oil the float G will rest upon the bottom of the lamp-body B. As the burner consumes the oil, the weight being thus decreased, the float will naturally rise toward the top in proportion to the reduction of the weight by the consumption of the burning fluid. As the float G is connected, as described, to the reservoir F, the said reservoir F will of course move up with the float, consequently the top level of the oil within the reservoir will always be about the same distance from the burner, which regularity of distance will insure a constant and equal flame during the whole period that the lamp may be burning.

Another great advantage in the construction of my improved lamp is that the burner is held at a sufficient distance from the oil to prevent the heat from the flame in any way affecting the oil; and, further, there is no unnecessary air-space in my lamp in which explosive gases may accumulate, which gases moreover are not likely to be generated as the flame is too far from the oil to produce them.

In Fig. 2 the reservoir F is provided with a float similar to G and connected to the tube B in the same manner, as shown in Figs. 1 and 6; but instead of it being straight, as in Fig. 1, the wick-tube B in Fig. 2 is bent so as to form a siphon between the reservoir F and burner A.

In Fig. 3 two burners A are shown. The wick-tubes B, leading from the burner A, connect with a central tube, I, which leads into the reservoir F, and forms a similar connection between the said reservoir and burner A, as described, and shown in Fig. 2.

In Fig. 4 two burners A are shown connected to the reservoir by the wick-tubes B, each shaped to form a siphon. These tubes are connected to the oil-reservoir F in the same manner as shown in Figs. 1, 2, and 3; but instead of the central tube, I, being employed to connect the two wick-tubes together the said central tube leads from the reservoir F to an oil-cup, J, through which oil or any other burning-fluid may be poured into the reservoir. The central tube, I, as shown in both Figs. 3 and 4, is connected to the reservoir F in the same manner as the tubes B are connected, so that the floating reservoir F may move freely vertically on all the said tubes.

Fig. 5 represents a lamp designed the same as shown in Fig. 3; but instead of the reservoir F being floated in water or other fluid it is balanced by the strings of weights K. These weights are connected to the bottom of the reservoir F by flexible chains or cords L, which pass over pulleys M, journaled in some convenient part of the frame of the lamp. These weights are calculated to represent a little less than the weight of the reservoir F when filled with oil. As the oil is consumed, the weights will naturally force up the reservoir F on the central tube, I. In order to prevent the upward speed of the reservoir increasing as the weight decreases, I arrange the weights K, as before described, on a flexible chain, L, and place them over a base-plate, N, so that the weights K, which descend as the reservoir ascends, will come in contact with the base-plate N, which thereby relieves the chains L of a portion of the weight, thereby equalizing the weight used to balance the reservoir F, and thus prevent the said reservoir ascending too quickly.

In another application filed by me of even date herewith, bearing the Serial No. 132,502, I show a lamp having a reservoir telescoping on a burner-tube; but this especial feature of said lamp is not claimed in said application.

What I claim as my invention is—

1. The burner A, fixed to the long stationary wick-tube B, in combination with the oil reservoir F, provided with a hole, $a$, through which the wick-tube passes, and a support calculated to carry the weight of the reservoir F when full, but arranged to move the said reservoir over the tube B closer to the burner in proportion to the consumption of the oil contained within the reservoir, substantially as and for the purpose specified.

2. The oil-reservoir F, adjustably fitted onto the wick-tube B, and provided with a float, G, extending into the lamp-body D, which contains water or other fluid, the said float being made of such a size and so connected to the oil-reservoir F that it forces by its buoyancy the said reservoir up toward the burner A in proportion to the consumption of the oil within the reservoir.

3. The lamp-body D, arranged to support the siphon-tubes B, to which the burners A are attached, in combination with the oil-reservoir F, floated within the lamp-body D, substantially as and for the purpose specified.

4. The oil-reservoir F, floated within the lamp-body D, as specified, and provided with holes $a$, for the passage of the tubes B, to which the burners A are attached, in combination with the central tube I, provided with oil-cup J, arranged substantially as and for the purpose specified.

Toronto, May 21, 1884.

MARMADUKE MATTHEWS.

In presence of—
CHAS. C. BALDWIN,
FREDERIC BARNARD FETHERSTONHAUGH.